Figure 1:
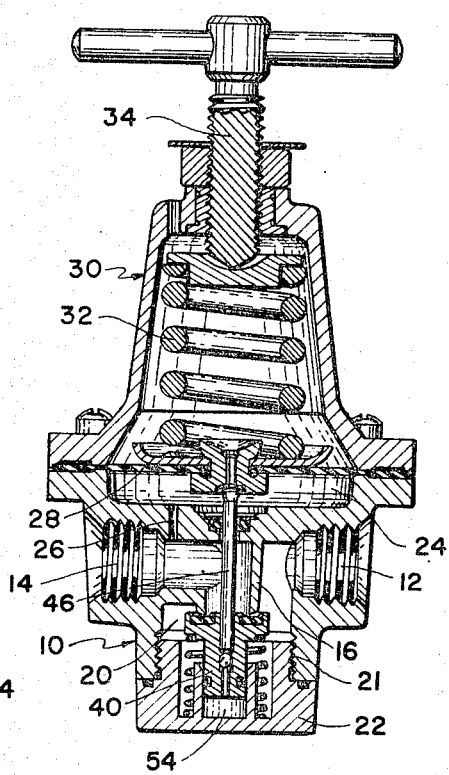

Nov. 1, 1966

H. G. HANSON ETAL 3,282,285

AIR LINE PRESSURE REGULATOR

Filed July 12, 1963

INVENTORS
Herbert G. Hanson
Dan E. Gorman
Edward W. Veres

BY

Atty.

United States Patent Office 3,282,285
Patented Nov. 1, 1966

3,282,285
AIR LINE PRESSURE REGULATOR
Herbert G. Hanson, Arlington Heights, Dan E. Gorman, Mount Prospect, and Edward W. Veres, Arlington Heights, Ill., assignors to The Bastian-Blessing Company, Chicago, Ill., a corporation of Illinois
Filed July 12, 1963, Ser. No. 294,671
6 Claims. (Cl. 137—116.5)

The present invention relates to air line diaphragm controlled pressure regulators and particularly to an improved construction in which the valve and diaphragm are mounted in full floating, independently guided relationship with a major balancing of pressures on opposite sides of the valve to assure sensitivity, lightness, ruggedness and minimal size for a large flow volume.

Heretofore, lightness and smallness of high pressure air line pressure regulators for a large flow area valve port has been avoided because of safety tolerance factors and operational difficulties experienced when used in compressor supplied air lines subjected to constant pulsations of pneumatic tools. Conventionally constructed regulators in order to stand up under operational and environmental abuse require heavy parts to withstand the high pressures, the pulsations and the heavy flows intermittently imposed upon the valve and diaphragm. This is true notwithstanding the fact that smallness for close spaces, lightness for air line support mounting, low inertia of elements for quick responsiveness contribute to a usefulness and performance desired by all users along with long service-free operation.

It is one of the objects of the present invention to provide an extremely small and light weight pressure regulator which has an excellent performance, exceptional sensitivity and large output, and which is easy to handle, install and service.

Another object of the invention is to provide a pressure regulator having a large flow area and capacity that is equally as sensitive as regulators of low flow area and little capacity yet will stand up under compressor pulsing and the surges of rapid and frequent pulsations of regulated air used for pneumatic tools.

Figure 2:
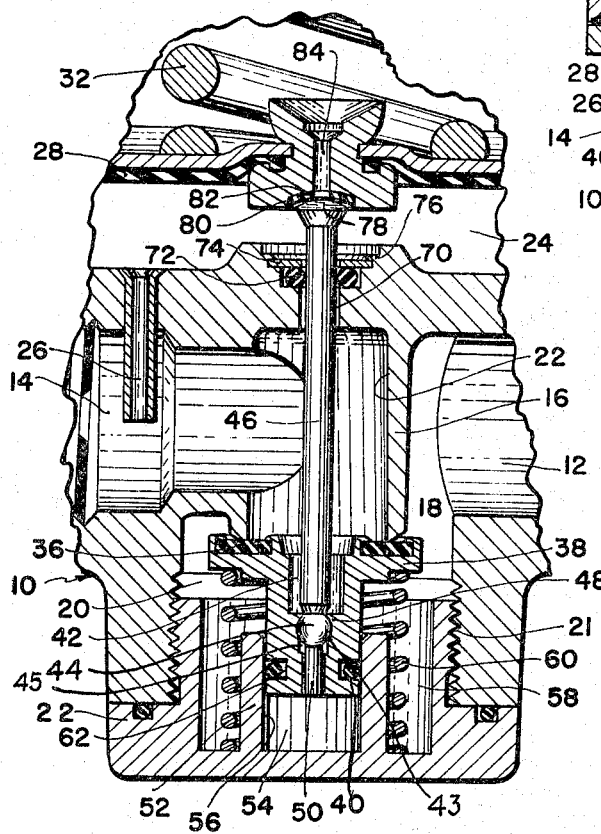

Other and further objects and advantages will become apparent from the description and the drawing relating thereto in which:

FIG. 1 is a longitudinal sectional view of a pressure regulator embodying the invention, and FIG. 2 is an enlarged fragmentary portion of FIG. 1 slightly modified showing the preferred construction.

The invention relates to a construction in which the valve head, diaphragm and valve stem are separate independently operative elements to avoid in a major way any hum or regulator noise. These parts are sufficiently light but of disproportionate inertial weights to avoid common moments of low frequency vibrations or harmonics thereof and the valve head and valve stem elements are lightly snubbed or dampened against vibration starting during operational movements of the parts.

Moreover, as an adjunct of the above physical characteristics, the valve working area is greatly increased for high volume flow and is pressure balanced to a major degree on opposite sides so that a big valve flow area can be managed with the sensitivity and operating characteristics of a small conventional valve whose load would be substantially equivalent to the slight pressure unbalance of the present valve. Thus all the features of a big size regulator are retained in a small light regulator including an extra large flow area valve that is controlled against vibration noises and deleterious effects particularly involved with regulation of an air line used to power intermittently operated and pulsating pneumatic tools which use different and various amounts of air at random or regular intervals, and particularly where pulses of an air compressor may also be present on the inlet side of the valve head. The compressor pressure may vary from 100 to 300 p.s.i. while the regulated pressure may be set from 50 to 150 p.s.i. depending upon the tools being used.

Referring now to FIG. 1, a machined die cast main body 10 is provided with a high pressure air inlet conduit 12 and a low pressure air outlet conduit 14, both threaded at their external openings for connection in and support on an air line used to power pneumatic tools (not shown). Between the inlet and outlet the body is provided with a cylindrical cross wall 16 defining at its end a tapered valve seat land 18 disposed within the valve inlet cavity 20. The cavity 20 is sealed from atmosphere by a back cap assembly 22 which carries a valve assembly that cooperates with and closes against the valve seat 18 to control the movement of high pressure air in the inlet conduit to the reduced pressure zone in the outlet conduit.

The body 10 has a diaphragm cavity 24 located remote from the back cap and in communication with the outlet conduit 14 through a passage 26. The cavity 24 is sealed from atmosphere by a diaphragm 28 held in sealed relation by a bonnet assembly 30. The bonnet side of the diaphragm is open to atmosphere through passage 31 and the bonnet assembly includes a bonnet spring 32 and spring tension adjusting screw 34 for the spring 32 for urging the valve assembly to an open position when air is being used from the outlet conduit and the pressure therein drops below that for which the spring and diaphragm are set.

More particularly, the back cap cavity 20 in the body is machined and threaded at 21 concentrically with the valve seat 18. The valve seat is provided with a predetermined port diameter or area that is closed by the valve seat disk 36 on the valve head 38 as defined by the circular line of closing contact between them. The valve head 38 carrying the disk 36 has a cylindrical boss 40 of a diameter related to said port diameter, as will be explained, and a conduit 42 extends through the valve disk 36 and head 38. An end thrust socket having a spherical shoulder 43 and a rectangular recess 45 therebelow for continuous communication is provided in the conduit 42 to receive the spherical head 44 of a valve actuating stem or pin 46. Preferably the wall of the conduit 42 above the head is inwardly upset at three spaced points 48 to hold the head 44 loosely in place. The pin 46 terminates beyond the shoulder 43 in a stem 50 which closely follows within a hundredth of an inch or so the adjacent wall of the conduit 42 that is around it in order to prevent gross misalignment and flutter of the pin and valve head at high air flow rates past or over the edges of the valve head.

The back cap 22 is machined with concentricity to the threads 21 to provide an annular boss 52 defining a well 54 having a microfinished wall 56 and an annular cavity 58 in which a back cap compression spring 60 is received to contact the back of the valve head 38 and urge its closure. A groove 62 around the cylindrical boss 40 receives an O-ring seal 64 which cooperates with the wall 56 to dampen vibratory movement of the valve head and to maintain the air pressure in the well 54 below the boss 40. The pressure maintained can be atmospheric or preferably the pressure in the outlet conduit 14 effective through the passage 42.

Preferably, the area of the piston 40 in the well 54 is only slightly less than the diameter of the valve port 18 and although it can be exposed to atmosphere as just mentioned along with the bonnet side of the diaphragm to provide a more direct relationship of balancing forces on the whole valve system with respect to a closing pressure on the valve seat disk, it is to be noted that only enough differential in forces is desired to assure a small regulator closing effect at the highest output pressure to be used or at the lowest input pressure that will be used. This can be factored against the closing pressure effort of the back cap spring, to arrive at a constant low p.s.i. of mechanical pressure between the valve seat and the valve seat disk required to attain an adequate closure against the excessive lock-up pressures but with the greatest longevity of the valve seat disk under the high frequency of closings occurring with pulsational pneumatic tool operations. Additional advantages in sensitivity and quick responsiveness are also derivatives which further provide for superior operation and performance. With a major balancing of pressures, the back cap spring can be selected to serve essentially to increase the effort opposing the opening of the valve the wider the valve opens. Also the bonnet spring can be selected which operates as though the high pressure air closing effort on the valve, namely the differential, is only that of a very small valve.

Furthermore, it is to be noted that the upper end of the pin 46 is supported for axial movement in cooperation with the diaphragm 28. A passage 70 is machined concentrically with the bonnet cavity 24 and is of a size substantially greater than the diameter of the pin 46 at this point so that the pin can be received therethrough and move laterally with some latitude. The passage 70 is shouldered to receive loosely an O-ring 72 held against axial movement by a retaining washer 74 held in place by peened body stock at 76. The O-ring 72 is free to move in a radial direction with any excursions permitted to the pin but hugs the stem frictionally to dampen any axial oscillations that might be induced in the stem by the spring supported assembly. The upper end 78 of the stem is enlarged and spherically shaped terminally to close in sealing contact with a valve seat washer 82 disposed in a recess 80 whereby a safety pressure relief valve port 84 vented to atmosphere is provided out through the bonnet 30. Thereby, whenever the lock-up pressure or pressure present in the outlet conduit 14 is too high, the diaphragm 28 is raised thereby to clear the upper end 78 of the pin 46 and air escapes through passage 84 to relieve the excess pressure. Thereupon, the diaphragm 28 returns to and closes the washer 82 against the head 78 to close the passage 84.

It will be observed that the axial distance of movement between the diaphragm 28 and body 10 is less than that permitted to the valve piston 40 in the well 54 so that the diaphragm spring 32 can never be tightened down enough to overload and damage the pin 46 or its end cooperating structures. The diaphragm bottoms before any undesired strain can be imposed on the pin.

Furthermore, it is pointed out that the ball and socket at 44 is located at or below the level of the mouth of the well so that it provides no cocking force upon the piston and valve disk. Its effective point of operation for the valve seat is actually within the confines of the well walls to generate a purely axial force. This allows the valve head to reseat itself evenly when closing because proper alignment is maintained from the back cap and valve nozzles by coaxial machining of the valve elements, without any overriding or lateral piloting action of the stem being imposed on the valve head.

Many advantages flow from the near balancing of fluid pressures on opposite sides of the valve head. Not only is the longevity of the valve seat disk greatly increased but the pin 46 itself can be greatly lightened and reduced in diameter to provide an even larger valve flow area. In fact with the balancing defined, the cross sectional area of the pin can be less than one-sixteenth the area of the valve port and can be longitudinally fluted if desired for a lesser area and maximum strength. Moreover, larger flow areas can be provided for given sizes of valves or diaphragms than heretofore provided and the longevity of the safety relief valve washer 82 is also enhanced. The spherical contour on the top of the stem 46 serves as a safety relief valve head without any requirement of a sharp edged valve nozzle and with little danger of misalignment upon reseating after a pressure relieving operation.

Noise or humming is eliminated from the regulator since tension forces between the diaphragm and valve head is broken by severance of the valve pin from cooperating elements at both the top and bottom, and the spring compression forces are light, as already explained. Being light they require only the light snubbing action accomplished by sealing the boss 40 in the well and by an O-ring on the stem held only against axial movement without being mechanically compressed or compressed under fluid pressure. Thus greater flow capacity, faster response, less inertia factors and better regulating characteristics are attained.

Having thus described the invention and many salient features and advantages it will be readily understood by those skilled in the art how various and further variations can be made without departing from the spirit of the invention the scope of which is commensurate with the appended claims.

What is claimed is:

1. In a pressure regulator, a body having inlet and outlet conduits and a diaphragm compartment in communication with the outlet conduit for equalizing pressures therebetween, a valve seat defining the entrance of said outlet conduit and having a predetermined diameter, a back cap having a well of a diameter slightly less than said predetermined diameter and disposed coaxial with said valve seat, a valve head slidably and sealingly mounted in said well for movement towards and away from said valve seat, means for balancing pressures on opposite sides of the valve head over opposing areas the size of said well area including a conduit for placing said well below said valve head in communication with fluid pressure that is effective upon one of the sides of said diaphragm, said valve head conduit having a shoulder therein disposed within the confines of the well, a valve stem pin loosely engaging said shoulder at one end and extending from said outlet conduit into said diaphragm compartment at the other end through an opening in the body therebetween, motion snubbing means frictionally interengaging said body and pin in said opening to dampen any axial oscillation of the pin, and a diaphragm sealing said compartment having a safety relief opening closed by said other end of the pin while said inlet and outlet conduits are in communication with each other through said valve seat.

2. In a pressure regulator, a body having inlet and outlet conduits and a diaphragm compartment in communication with the outlet conduit for equalizing pressures therebetween, a valve seat defining the entrance of said outlet conduit and having a predetermined diameter, a back cap having a well of a diameter slightly less than said predetermined diameter and disposed coaxial with said valve seat, a valve head slidably and sealingly mounted in said well for movement towards and away from said valve seat, and having a conduit therethrough placing said well in communication with the outlet conduit to balance pressures on opposite sides of the valve head over opposing areas the size of said well area, said valve head conduit having a shoulder therein below the level of the top of the well, a valve stem pin loosely engaging said shoulder at one end in a ball and socket relationship and extending from said outlet conduit into said diaphragm compartment at the other end through an opening in the body therebetween, resilient, motion snubbing means in said opening frictionally interengaging said body and pin to dampen any axial oscillation of the pin, and a diaphragm sealing said compartment having a safety relief opening closed by said other end of the pin while said inlet and outlet conduits are in communication with each other through said valve seat, the cross sectional area of said pin being approximately one-sixteenth of the area of said valve port.

3. In a pressure regulator, a body having inlet and outlet conduits and a diaphragm compartment in communication with the outlet conduit for equalizing pressure therebetween, a diaphragm sealing said compartment and having a safety relief opening bonnet means including a diaphragm control spring and a bonnet venting said safety relief opening to atmosphere, a valve seat defining the entrance of said outlet conduit and having a predetermined diameter, a back cap having a well of a slightly less diameter disposed coaxial with said valve seat, a valve head slidably and sealingly mounted in said well for movement towards and away from said valve seat means for placing said well below said valve head in communication with fluid pressure effective upon one of the sides of said diaphragm to balance pressures on opposite sides of the valve head over areas the size of said well area, said valve head having a shoulder recessed therein below the level of the top of the well, a valve stem pin loosely carried by said valve head in engagement with said shoulder at one end and at the other end extending from said outlet conduit into said diaphragm compartment through an opening therebetween to be engaged by said diaphragm and terminally cooperate with and close said safety relief opening, motion snubbing means frictionally interengaging said body and pin in said opening under equalized pressures on opposite sides thereof to provide a constant light dampening of any axial oscillation of the pin, the distance between the diaphragm and the body in valve opening direction being appreciably less than the distance available within which the valve head may move in said well without obstruction.

4. In a pressure regulator for a pneumatic line powering an intermittently operated, pneumatic tool, a body having inlet and outlet conduits and a diaphragm compartment in communication with the outlet conduit for equalization of pressures therebetween, a valve seat around the entrance of said outlet conduit of predetermined diameter, a back cap having a well of a slightly less diameter disposed coaxial with said valve seat, a valve head slidably and sealingly mounted in said well for movement towards and away from said valve seat and having a conduit coaxially therethrough placing said well in communication with the outlet conduit to balance pressures on opposite sides of the valve head over areas the size of said well area, said valve head conduit having a spherical shoulder therein below the level of the top of the well, a valve stem pin loosely engaging said shoulder at one end in mating relation and extending into said diaphragm compartment at the other end and terminating in a spherically shaped end face, motion snubbing means frictionally interengaging said body and pin with equalized pressures on opposite sides to dampen any axial oscillation of the pin with a constant degree of contact therewith, and a diaphragm sealing said compartment having a spherically recessed safety relief opening closed in mating relationship by said other end face of the pin while said inlet and outlet conduits are in communication with each other through said valve seat, means for placing said well below said valve head in communication through said spherical shoulder with fluid pressure effective upon one of the sides of said diaphragm, the cross sectional area of said pin being approximately one-sixteenth of the area of said valve port, and having an extension beyond said shoulder dimensional in loosely guided relationship with the wall of said conduit.

5. In a pressure regulator for a pneumatic line powering an intermittently operated pneumatic tool, a body having inlet and outlet conduits and a diaphragm compartment in communication with the outlet conduit for equalization of pressures therebetween, a valve seat defining the entrance of said outlet conduit and having a predetermined diameter, a removable back cap having a cylinder well of a diameter slightly less than said predetermined diameter and disposed coaxial with said valve seat, a valve head piston slidably and sealingly mounted in said well for movement towards and away from said valve seat when the back cap is installed, means for balancing pressures on opposite sides of the valve head over opposing areas the size of said piston area including a conduit for placing said well below said valve head in communication with fluid pressure that is effective upon one of the sides of said diaphragm, said valve head conduit having a spherically shaped shoulder therein disposed within the confines of the well, a valve stem pin loosely secured in engagement with said shoulder at one end and extending through an opening in the body from the outlet conduit into said diaphragm compartment at the other end, motion snubbing means lightly engaging the pin comprising an O-ring in said opening carried by the body and frictionally engaging the pin to dampen any axial oscillation of the pin, said pin having a cross sectional area approximately one-sixteenth of the area of said valve port, and a diaphragm sealing said compartment having a safety relief opening closed by said other end of the pin when the back cap is installed during the time said inlet and outlet conduits are in communication with each other through said valve seat.

6. In a pneumatic line pressure regulator subjected to pneumatic pulses, a body having inlet and outlet conduits and a diaphragm compartment in communication with the outlet conduit for equalization of pressure therebetween, a valve seat defining the entrance of said outlet conduit and having a predetermined diameter, a back cap having a cylinder well of a diameter slightly less than said predetermined diameter and disposed coaxial with said valve seat, a valve head having a piston portion slidably and sealingly mounted in said well for guiding a valve head portion towards and away from said valve seat and having a conduit therethrough placing said well in communication with the outlet conduit to balance pressures on opposite sides of the valve head over opposing areas the size of said cylinder well area, said valve head conduit having a spherical shoulder therein, a valve stem pin loosely mating with said shoulder at one end at a spherical contact area within said well and extending into said diaphragm compartment at the other end a distance less than the throw of said valve and terminating in a convexly spherical surface, an O-ring snubbing means between said body and pin carried by one and frictionally engaging the other to dampen any axial oscillations of the pin, a diaphragm sealing said compartment and having a safety relief opening closed by said convexly spherical end of the pin while said inlet and outlet conduits are in communication with each other through said valve seat, the cross sectional area of said pin being approximately one-sixteenth of the area of said valve port, a back cap spring urging closure of the valve, bonnet means defining a bonnet compartment vented to the atmosphere and including a spring engaging said diaphragm and urging an opening of the valve.

References Cited by the Examiner

UNITED STATES PATENTS

| | | | |
|---|---|---|---|
| 2,650,455 | 9/1953 | Jacobsson | 137—505 |
| 2,707,966 | 5/1955 | Taplin | 137—116.5 |
| 2,731,975 | 1/1956 | Boals | 137—505.18 X |
| 2,806,481 | 9/1957 | Faust | 137—116.5 |
| 2,919,711 | 1/1960 | Lord et al. | 137—116.3 X |
| 2,981,280 | 4/1961 | Cornelius | 137—505.26 |

M. CARY NELSON, *Primary Examiner.*

HENRY T. KLINKSIEK, LAVERNE D. GEIGER,
*Examiners.*